(12) United States Patent
Sheu

(10) Patent No.: US 6,914,359 B2
(45) Date of Patent: Jul. 5, 2005

(54) DATA STORAGE DEVICE WITH REDUCED ROTOR INERTIA

(75) Inventor: Ming-Goei Sheu, Cupertino, CA (US)

(73) Assignee: ESGW Holdings Limited, Tortola (VG)

( * ) Notice: Subject to any disclaimer, the term of this patent is extended or adjusted under 35 U.S.C. 154(b) by 0 days.

(21) Appl. No.: 10/384,248

(22) Filed: Mar. 7, 2003

(65) Prior Publication Data

US 2004/0174077 A1 Sep. 9, 2004

(51) Int. Cl.[7] .............................................. H02K 5/16
(52) U.S. Cl. ......................................................... 310/90
(58) Field of Search ........................... 360/98.07–99.08; 310/90, 67 R, 89

(56) References Cited

U.S. PATENT DOCUMENTS

| | | | | |
|---|---|---|---|---|
| 5,444,586 A | * | 8/1995 | Iftikar et al. | 360/99.12 |
| 5,768,051 A | * | 6/1998 | Kora et al. | 360/99.08 |
| 5,877,916 A | * | 3/1999 | Papst | 360/98.07 |
| 6,344,946 B1 | * | 2/2002 | Papst | 360/99.08 |
| 2003/0197438 A1 | * | 10/2003 | Oku | 310/90 |
| 2004/0061404 A1 | * | 4/2004 | Fujii et al. | 310/216 |
| 2004/0104634 A1 | * | 6/2004 | Nishimura et al. | 310/90 |

* cited by examiner

Primary Examiner—Darren Schuberg
Assistant Examiner—Heba Elkassabgi
(74) Attorney, Agent, or Firm—George O. Saile; Stephen B. Ackerman

(57) ABSTRACT

A data storage device (10) includes a housing enclosing a clean room chamber (CR), a stator (20), a rotor (40), and a plurality of data storage disks (60). The housing includes an upper partition (12) and a lower partition (14). The stator includes a plurality of stator laminations (22) each having a winding (24) wound thereareound, and a shaft (30) having opposite ends fixed with the upper partition and the lower partition. The rotor includes a hub (44), a tube (42) fixed in the hub, and a magnet (46) surrounded by the stator laminations. The hub includes a radially extending shoulder (45) for supporting the disks thereon. The tube surrounds the shaft, with a pair of bearings (50) rotatably connecting the tube to the shaft. A clamp (80) is secured on the hub, and presses on a top one of the disks to mount the disks to the hub.

10 Claims, 3 Drawing Sheets

DATA STORAGE DEVICE WITH REDUCED ROTOR INERTIA

BACKGROUND OF THE INVENTION

1. Field of the Invention

The present invention relates to electronic data storage devices, and more particularly to a data storage device with reduced rotor inertia.

2. Description of Prior Art

Computer disk storage devices include those which utilize one or more rigid magnetic data storage disks directly coupled to the rotor of a spindle drive motor and housed within a "clean room" chamber. Such storage devices typically employ an "outer rotor" brushless DC motor for rotating the storage disks past data read/write heads. The heads write and read digital data on the surface of the disks. In an "outer rotor" brushless motor, a rotor having an annular permanent magnet surrounds a multi-pole stator that is mounted concentrically with the shaft, the shaft defining the axis of rotation of the motor.

FIG. 2 shows a conventional data storage device which comprises a stator 120, a rotor 140, and a plurality of parallel, spaced disks 160 attached to the rotor 140 by a clamp 180. The stator 120 comprises a plurality of radial stator laminations 122. A winding 124 is wound around each stator lamination 122. The rotor 140 comprises a shaft 142 rotatably attached to the stator 120 by a pair of bearings 144, and a hub 146 fixed around the shaft 142. A magnet 148 is attached to a radially extending portion 147 of the hub 146, and opposes free ends of the stator laminations 122. When the windings 124 are electrified, the magnet 148 drives the combined rotor 140, disks 160 and clamp 180 to rotate about the shaft 142.

However, the outer rotor data storage device employs the rotor 140 that encompasses the stator element. The rotor 140 therefore requires a diameter that adds to the mass and angular inertia of the rotor 140. This increases the time required for a motor of the data storage device to reach a desired operating speed at startup. The radially displaced mass also amplifies vibration due to imbalances, especially at higher operational speeds. Furthermore, the shaft 142 is essentially a cantilever structure, with only one end of the shaft 142 being fixed with the hub 146. This also amplifies vibration and instability.

SUMMARY OF THE INVENTION

Accordingly, an object of the present invention is to provide a data storage device with reduced rotor inertia.

Another object of the present invention is to provide a data storage device with a stable rotor.

To achieve the above objects, a data storage device in accordance with the present invention comprises a housing enclosing a clean room chamber, a stator, a rotor and a plurality of data storage disks. The housing comprises an upper partition and a lower partition. The stator comprises a plurality of stator laminations each having a winding wound therearound, and a shaft having opposite ends fixed with the upper partition and the lower partition. The rotor comprises a hub, a tube fixed in the hub, and a magnet surrounded by the stator laminations. The hub comprises a radially extending shoulder for supporting the disks thereon. The tube surrounds the shaft, with a pair of bearings rotatably connecting the tube to the shaft. A clamp is secured on the hub, and presses on a top one of the disks to mount the disks to the hub. The rotor has reduced mass because the magnet is not fixed to a radially-extending support structure. This also allows the rotor to be located closer to the axis of rotation. These features reduces angular inertia of the rotor and allow the same drive torque to accelerate the rotor to the required operating speed in a shorter time, and reduce vibrations at higher operating speeds.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
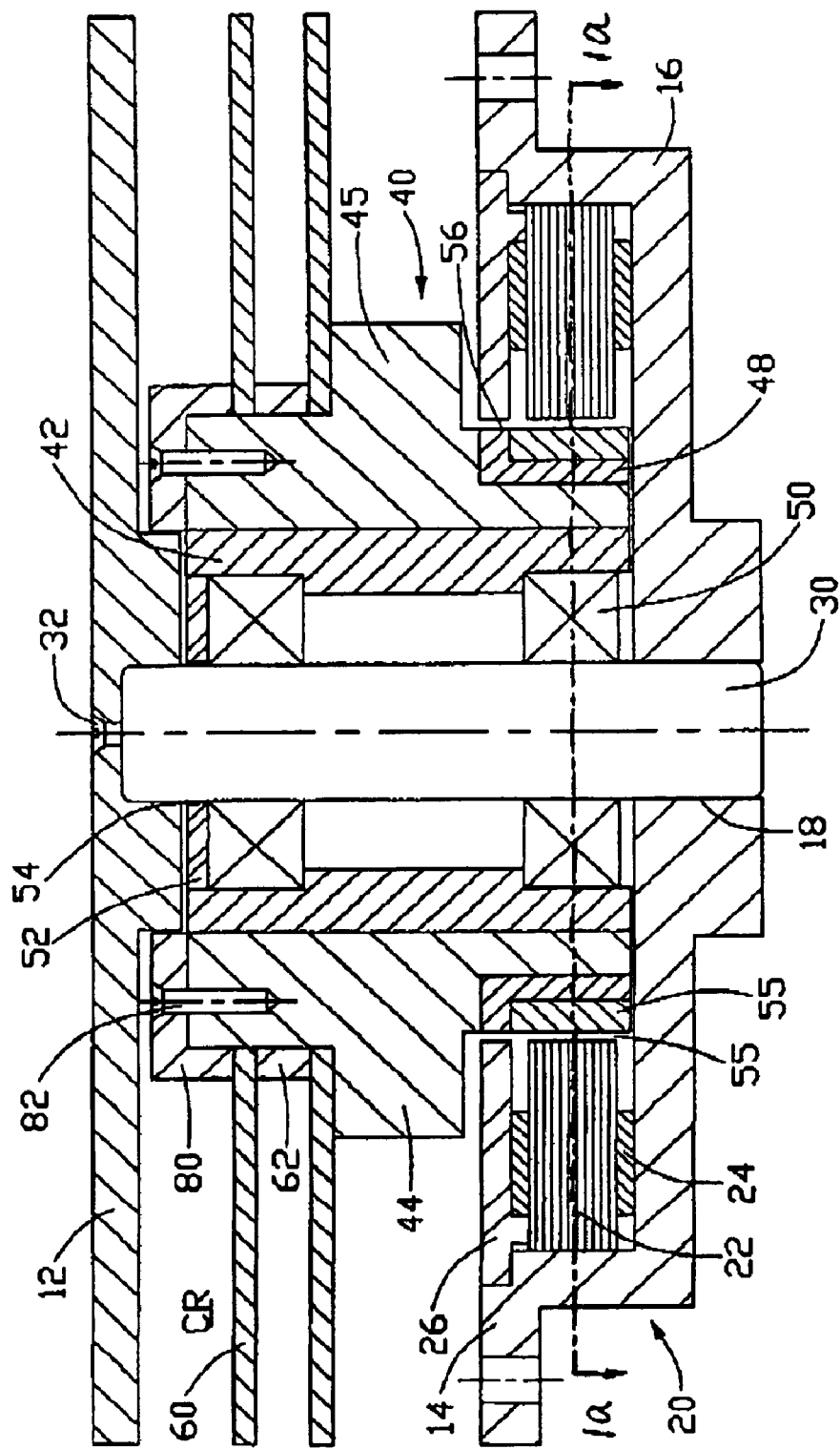
FIG. 1 is a schematic, cross-sectional view of a data storage device in accordance with the preferred embodiment of the present invention.
Figure 1A:
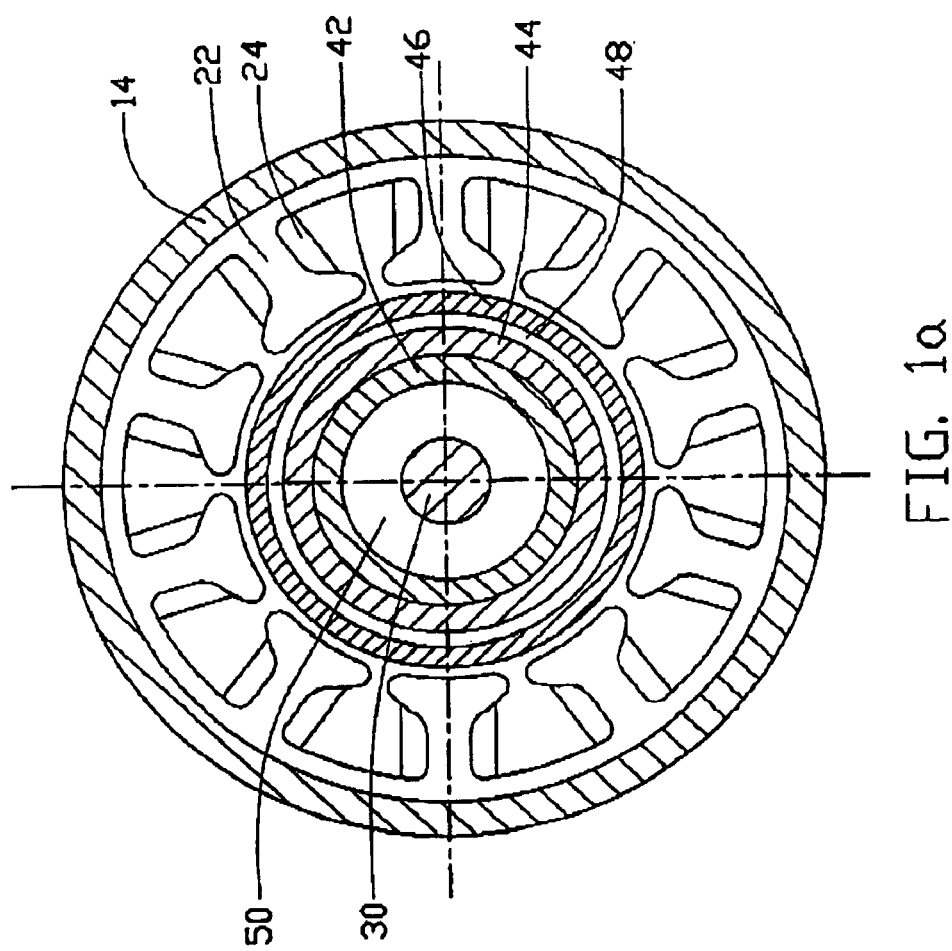
FIG. 1a is a cross-sectional view taken along the line 1a—1a of FIG. 1.
Figure 2:
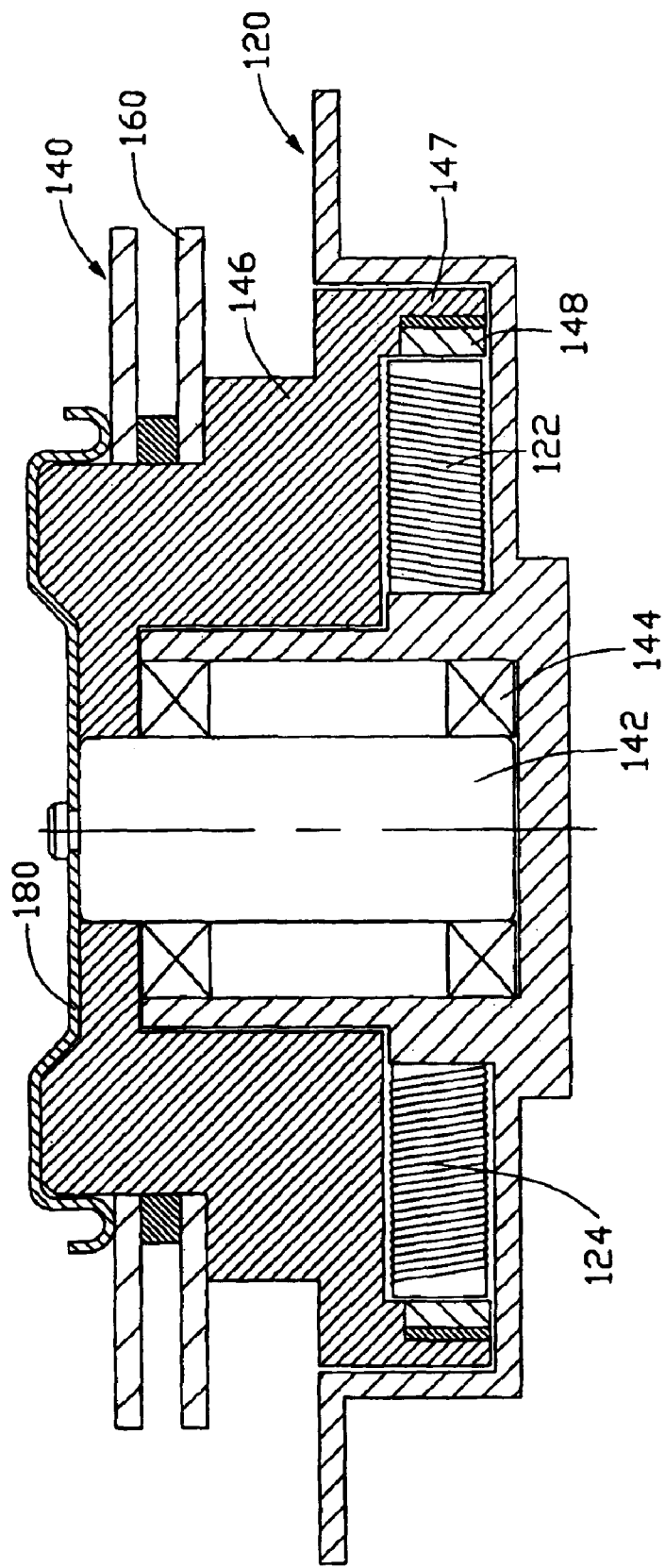
FIG. 2 is a schematic, cross-sectional view of a conventional data storage device.

Referring to FIG. 1, a data storage device 10 in accordance with the preferred embodiment of the present invention comprises a housing having an upper partition 12 and a lower partition 14. The upper and lower partitions 12, 14 can adjoin side walls (not shown) to form a substantially sealed "clean room chamber" CR. The lower partition 14 has a bottom recessed portion 16. A through hole 18 is defined in a center of the recessed portion 16. The data storage device 10 further comprises a stator 20, a rotor 40, a plurality of data storage disks 60, and a clamp 80 securing the disks 60 to the rotor 40.

The stator 20 comprises a plurality of spaced radial stator laminations 22 accommodated in the recessed portion 16 of the lower partition 14. A winding 24 is wound around each stator lamination 22. A stator shield 26 is secured on the lower partition 14, for protectively covering the stator laminations 22 and windings 24. A shaft 30 is interferentially fixed in the lower partition 14, a bottom end of the shaft 30 being fixed in the hole 18 of the lower partition 14. A top end of the shaft 30 is fixed to the upper partition 12 by a screw 32.

The rotor 40 comprises a tube 42, a hub 44, and a magnet 46. The tube 42 surrounds the shaft 30 of the stator 20, with a pair of bearings 50 rotatably connecting the tube 42 to the shaft 30. A seal 52 is attached in a top portion of the tube 42, for protectively covering an upper one of the bearings 50. A narrow gap 54 is defined between an inner circumferential surface of the seal 52 and an outer circumferential surface of the shaft 30. The gap 54 functions as a gap seal to minimize transfer of loose particles and other contaminants emanating from the bearings 50 to the clean room chamber CR. The hub 44 interferentially surrounds the tube 42. The hub 44 has a radially extending shoulder 45 for supporting the disks 60 thereon. The hub 44 may be made of an aluminum alloy, which after machining is a material suitable for use in a clean room chamber environment. A magnet shield 48 is attached to and surrounds a bottom portion of the hub 44. The magnet shield 48 has an L-shaped cross section. A narrow gap 56 is defined between an inner periphery of the stator shield 26 and an outer periphery of the magnet shield 48. The gap 56 functions as a gap seal to minimize transfer of loose particles and other contaminants to the clean room chamber CR. The magnet 46 is in the form of an annular ring, and fixed to the shield member 48. The magnet 46 is separated from the free ends of the stator laminations 22 by a cylindrical air gap 55. A plurality of evenly spaced screw holes is defined in a top portion of the hub 44. One or more spacer rings 62 surrounds an upper portion of the hub 44, the spacer rings 62 separating the disks 60. The clamp 80 is fastened on a top end of the hub 44 by screws 82 that engage in the screw holes of the hub 44. The clamp 80 presses against a topmost one of the disks 60 to couple the disks 60 to the hub 44.

In the present invention, the data storage device 10 employs an inner rotor structure. The rotor 40 has reduced mass because the magnet 46 and magnet shield 48 are not fixed to a radially-extending support structure, as required in an outer rotor design. This allows the rotor mass to be reduced, and to be located closer to the axis of rotation. These features allow the same drive torque to accelerate the rotor to the required operating speed in a shorter time, and reduce vibrations at higher operating speeds. Furthermore, the shaft 30 is a fixed shaft fixed on both ends. This is a stronger structure than a cantilever as used in a conventional data storage device. The shaft 30 also enhances a strength of the housing because the shaft 30 is fixed to both the upper partition 12 and the lower partition 14 of the housing.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A data storage device comprising:
   a housing enclosing a clean chamber, the housing comprising a first partition and an opposite second partition;
   a stator comprising a plurality of stator laminations and a shaft, opposite ends of the shaft fixed with the first partition and the second partition;
   a rotor comprising a hub, the hub having a shoulder, a magnet opposing the stator laminations, and a magnet shield interposed between said hub and said magnet; and
   at least one disk seated on the shoulder and received in the clean chamber; wherein the stator further comprises a stator shield attached on the second partition and cooperating with the second partition to define a substantially sealed space therebetween, the stator laminations and the magnet are protectively accommodated in the space and wherein the rotor further comprises a tube fixed in the hub and surrounding the shaft of the stator, with a pair of bearings rotatably connecting the tube to the shaft, said tube having an attached upper seal extending over and protectively covering one of the bearings and spaced apart from said shaft by a gap seal thereby protecting said clean chamber from debris.

2. The data storage device as claimed in claim 1, wherein the magnet is surrounded by the stator laminations.

3. The data storage device as claimed in claim 1, wherein the magnet shield is "L" shaped and is attached to an underside recess in an end portion of the hub, and wherein the magnet is attached to the magnet shield such that the magnet shield is interposed between the magnet and the hub at both lateral and upper surfaces of the recess.

4. The data storage device as claimed in claim 1, wherein a clamp is fixed on the hub and presses on the at least one disk.

5. A data storage device comprising:
   a stator having a first partition, an opposite second partition, and a fixed shaft connecting the first partition and the second partition, the stator comprising a plurality of stator laminations and both ends of said shaft including means for fastening to a corresponding housing which receives the stator and the rotor therein;
   a rotor rotatable about the shaft, the rotor comprising a hub and a magnet mounted on an end portion of the hub and surrounded by the stator laminations; and
   at least one disk mounted on an opposite end portion of the hub; wherein the stator further comprises a stator shield attached on the second partition and cooperating with the second partition to define a substantially sealed space therebetween, and wherein the stator laminations and the magnet are protectively accommodated in the space.

6. The data storage device as claimed in the claim 5, wherein the first partition and the second partition define a clean chamber therebetween, in which the at least one disk is received.

7. The data storage device as claimed in claim 6, wherein opposite ends of the shaft are fixed with the first and second partitions.

8. The data storage device as claimed in claim 5, wherein a winding is wound on each of the stator laminations.

9. The data storage device as claimed in claim 8, wherein the stator shield is secured on the second partition for covering the stator laminations and windings.

10. The data storage device as claimed in claim 9, wherein the rotor further comprises a tube fixed in the hub and surrounding the shaft of the stator, with a pair of bearings rotatably connecting the tube to the shaft.

* * * * *